(12) United States Patent
Lodha et al.

(10) Patent No.: US 6,798,741 B2
(45) Date of Patent: Sep. 28, 2004

(54) METHOD AND SYSTEM FOR RATE SHAPING IN PACKET-BASED COMPUTER NETWORKS

(75) Inventors: Sandeep Lodha, Sunnyvale, CA (US); Deepak J. Aatresh, Saratoga, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 364 days.

(21) Appl. No.: 10/007,409

(22) Filed: Dec. 5, 2001

(65) Prior Publication Data

US 2003/0107988 A1 Jun. 12, 2003

(51) Int. Cl.[7] .............................................. G01R 31/08
(52) U.S. Cl. ..................... 370/229; 370/230.1; 370/232
(58) Field of Search ........................ 370/229, 230–238, 370/230.1, 252, 413; 375/232–235; 326/222; 324/350–355, 260, 364; 706/21; 705/40; 455/405

(56) References Cited

U.S. PATENT DOCUMENTS

| | | | |
|---|---|---|---|
| 4,750,175 A | | 6/1988 | Brenneman et al. |
| 5,251,213 A | | 10/1993 | Videlock et al. |
| 5,276,677 A | * | 1/1994 | Ramamurthy et al. ...... 370/232 |
| 5,748,901 A | | 5/1998 | Afek et al. |
| 5,790,131 A | | 8/1998 | Liang et al. |
| 5,796,719 A | | 8/1998 | Peris et al. |
| 5,907,800 A | * | 5/1999 | Johnson et al. ............. 455/405 |
| 6,052,375 A | | 4/2000 | Bass et al. |
| 6,144,639 A | * | 11/2000 | Zhao et al. .................. 370/235 |
| 6,407,983 B1 | * | 6/2002 | Zheng et al. ................ 370/232 |
| 6,411,946 B1 | * | 6/2002 | Chaudhuri .................... 706/21 |
| 6,549,587 B1 | * | 4/2003 | Li ............................... 375/326 |
| 6,584,111 B1 | * | 6/2003 | Aweya et al. ............... 370/412 |
| 6,597,660 B1 | * | 7/2003 | Rueda et al. ............ 370/230.1 |
| 2001/0012272 A1 | | 8/2001 | Aubert et al. |

OTHER PUBLICATIONS

R. Caceres et al, Multicast–Based Interference of Network–Internal Characteristics: Accuracy of Packet Loss Estimation, Mar. 1999, Eighteenth Annual Joint Conference of the IEEE Computer and Communication Societies, vol. 1, pp. 371–379.*

Y. Bernet et al., A conceptual Model for Diffserv Routers, Jun. 1999, Section 5.

* cited by examiner

*Primary Examiner*—Chi Pham
*Assistant Examiner*—Prenell Jones
(74) *Attorney, Agent, or Firm*—Mark A. Wilson

(57) ABSTRACT

The flow of packet-based traffic is controlled to meet a desired rate by calculating, as a moving average, a current rate of packet-based traffic on a link, calculating the sum of the error between the calculated current rate and the desired rate, and determining whether or not packets can flow in response to the calculated sum of the error. When the sum of the error between the current rate and the desired rate indicates that the current rate is less than the desired rate, packets are allowed to flow and when the sum of the error indicates that the current rate is greater than the desired rate, packets are not allowed to flow. The magnitude of bursts can also be controlled by artificially controlling the minimum values of the current rate and the sum of the error. The flow control algorithm can be used for rate shaping or rate limiting.

55 Claims, 9 Drawing Sheets

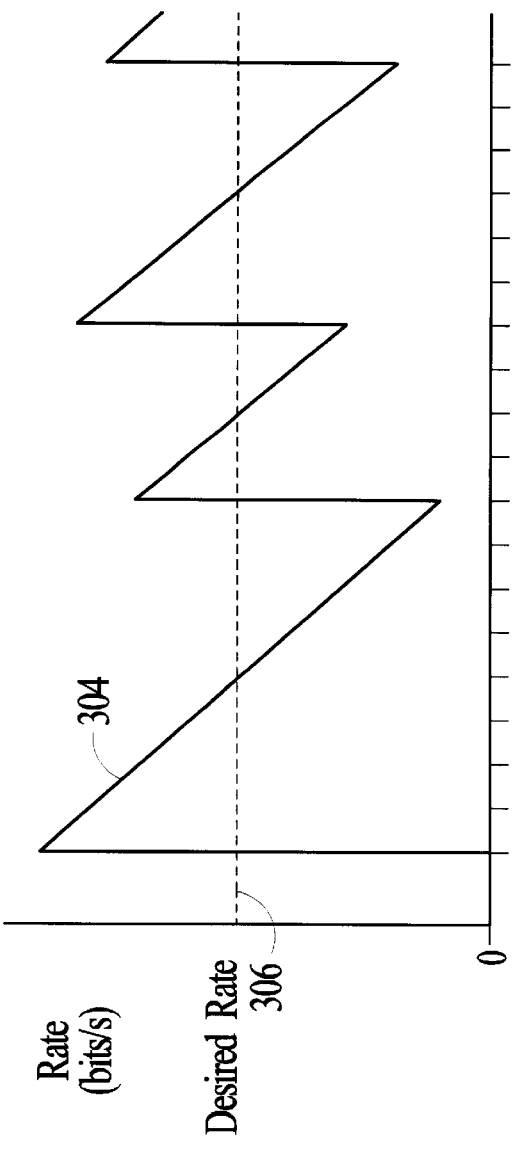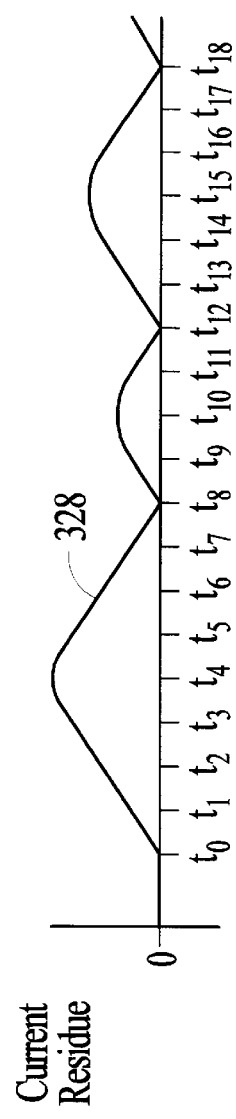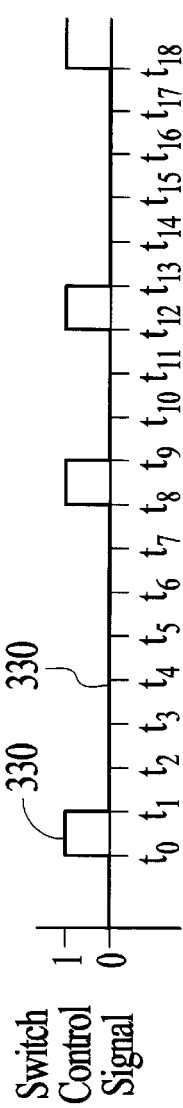
FIG. 3A
FIG. 3B
FIG. 3C

Selector Logic

| RS1_Desired | RS1_Max | Packets in Buffer 2? | S1 Status |
|---|---|---|---|
| 1 | Doesn't Matter | Doesn't Matter | 1 |
| 0 | 0 | Doesn't Matter | 0 |
| 0 | 1 | Yes | 0 |
| 0 | 1 | No | 1 |

METHOD AND SYSTEM FOR RATE SHAPING IN PACKET-BASED COMPUTER NETWORKS

FIELD OF THE INVENTION

The invention relates to packet-based computer networks, and more particularly to controlling traffic rates within a packet-based network.

BACKGROUND OF THE INVENTION

Packet-based networks are known to transmit data in bursts. Bursty traffic can cause congestion in the network and can cause packets to be dropped when input buffers are full. In order to improve the performance of a network and to provide guaranteed quality of service (QoS), it is necessary to be able to control the flow of traffic at various locations in the network to a particular desired rate. Two techniques for controlling the flow of traffic are generally referred to as rate shaping and rate limiting. Rate shaping involves buffering packets as they arrive at a location and then controlling the flow of packets leaving the buffers according to a given algorithm to meet a desired rate. Because packets are buffered, bursts of packets can be absorbed and then dispatched in a controlled manner such that incoming packets are not dropped. Rate limiting involves measuring the rate of packets coming into a location and then dropping the packets that arrive in excess of the desired rate.

Some common algorithms that can be used to accomplish rate shaping or rate limiting include the well-known leaky bucket and token bucket algorithms. Using a leaky bucket algorithm to accomplish rate shaping involves buffering incoming packets and then dispatching the packets from the buffer at a constant rate, i.e., the leak rate (measured, for example, in bytes/second). For example, when a packet of size C (i.e., in bytes) is received, it is held in the buffer for a time period of C/leak rate before it is dispatched from the buffer. While the buffer is empty, the transmission capacity, as dictated by the leak rate, goes unused and is not accumulated for subsequent bursts of packets. Therefore, when a new burst of packets arrives in the buffer after a period of no traffic, the new packets are still buffered and dispatched at the leak rate. This technique does not provide flexibility to account for the bursty nature of packet-based network traffic.

Using a token bucket algorithm for rate shaping involves assigning a bit value (i.e., 1,000 bytes, 50 cells, etc.) to a bucket at a constant rate and allowing packets to be dispatched from a buffer only if the requisite number of bits, bytes, or cells have accumulated in the bucket. During periods of no traffic, bits continue to accumulate in the bucket at the constant rate and subsequent bursts of traffic can utilize the accumulated bits. Although this technique does provide flexibility to account for the bursty nature of network traffic, if the bucket accumulates too many bits during periods of no traffic, subsequent packet bursts may not be shaped. The size of an allowable burst can be limited by setting a maximum value for the number of bits that can accumulate in a bucket, however the maximum value for the bucket must be at least as large as the largest expected packet in order to prevent a large packet from being trapped in the buffer. A disadvantage to setting the maximum bucket size to the size of the largest expected packet is that it will allow large bursts of relatively small packets to go out unshaped.

Another algorithm that can be used for rate shaping or rate limiting involves calculating a current traffic rate at a location and comparing the current rate to the desired rate to determine whether or not subsequent packets should be dispatched. According to the algorithm, if the current rate is less than the desired rate, then packets are allowed to flow and if the current rate is greater than the desired rate, then packets are not allowed to flow. One known algorithm such as this that is used for rate shaping is referred to as an exponential weighted moving average (EWMA) algorithm. An example of an EWMA algorithm is expressed as:

$$\text{Current\_Rate}_N = (1-\text{Gain}) \cdot \text{Current\_Rate}_{N-1} + \text{Gain} \cdot \text{Bytes}_N$$

with, $t_{N+1} = t_N + \Delta t$ where $\text{Current\_Rate}_N$ is the EWMA in the $N^{th}$ sampling interval, $\text{Current\_Rate}_{N-1}$ is the EWMA in the N−1 sampling interval, and $\text{Bytes}_N$ is the number of bytes that were dispatched during the $N^{th}$ sampling interval, where each sampling interval has a period of $\Delta t$. The Gain controls the time constant (i.e., frequency response) of what is essentially a low-pass filter operation. When used to dispatch packets from a buffer, if the $\text{Current\_Rate}_N$ is greater than a pre-defined desired rate (referred to as Desired_Rate), then no packets are dispatched. If the $\text{Current\_Rate}_N$ is less than the Desired_Rate, then packets are dispatched. An algorithm for controlling the dispatch of packets from a buffer is expressed in the prior art as:

if ($\text{Current\_Rate}_N > \text{Desired\_Rate}$)

No packets dispatched else

Packets dispatched

FIG. 1 depicts an example graph of the current rate of traffic 104 versus time (in increments of $\Delta t$) that results from application of the above-described EWMA algorithm in a rate shaping system where the buffer is fully loaded with packets. At an initial time, $t_0$, a burst of traffic is dispatched and the current rate, calculated as the EWMA, jumps up above the desired rate, where the desired rate is indicated by horizontal dashed line 106. As long as the current rate is above the desired rate, no new traffic is dispatched and the current rate steadily declines. Once the current rate declines to below the desired rate (i.e., time $t_2$), a new burst of traffic is dispatched and the current rate jumps back up above the desired rate. As depicted in FIG. 1, in a fully loaded system, the current rate of traffic is almost entirely above the desired rate because the moment the current rate drops below the desired rate, more packets are dispatched. Because the current rate is almost entirely above the desired rate, the achieved transmission rate over a period of full loading will be greater than the desired rate, where the achieved rate is calculated as the total number of bits dispatched divided by the time period over which the bits were dispatched. For example, in FIG. 1 the achieved rate 108 over the time period $t_0$ through $t_9$ in a fully loaded system is above the desired rate. Ideally, the achieved rate should be equal to the desired rate.

In view of the need to be able to control certain network traffic to desired rates and in view of the disadvantages of prior art rate shaping and rate limiting algorithms, what is needed is an algorithm that can effectively control packet-based traffic rates, that is flexible, and that is easy to implement, especially in hardware.

SUMMARY OF THE INVENTION

A method and system for controlling the flow of packet-based traffic to meet a desired rate involves calculating, as a moving average, a current rate of packet-based traffic on a link, calculating the sum of the error between the calculated current rate and the desired rate, and determining whether or not packets can flow in response to the calculated sum of the error. In an embodiment, when the sum of the error between the current rate and the desired rate is less than or equal to zero, packets are dispatched from a buffer onto a link and when the sum of the error is greater than zero, packets are held in the buffer. Because the flow of packets is controlled in response to the sum of the error between the current rate and the desired rate, the achieved rate of traffic is maintained close to the desired rate even in bursty traffic environments.

In an embodiment of the invention, the sum of the error is compared to a threshold value to determine whether or not packets are allowed to flow. Packets are allowed to flow if the sum of the error is below the threshold and are not allowed to flow if the sum of the error is above the threshold. In an embodiment, the threshold value is zero and packets are allowed to flow if the sum of the error is less than or equal to zero. In another embodiment, packets are allowed to flow when the sum of the error indicates that the achieved rate of traffic is below the desired rate and are not allowed to flow when the sum of the error indicates that the achieved rate of traffic is above the desired rate.

In order to control the magnitude of bursts that are allowed to flow after periods of no traffic, a minimum value can be established for the current rate. The calculated current rate is adjusted to the minimum value if the current rate is below the minimum value. Similarly, a minimum value can be established for the sum of the error, with the calculated sum of the error being adjusted to the minimum value if the sum of the error is below the minimum value. Both of these techniques control the amount of bandwidth that can be "borrowed" from periods of silence. Specifically, the later (second) technique prevents large negative residues from accumulating.

In an embodiment, the process of calculating the current rate and the sum of the error and determining whether or not packets can flow is repeated every cycle, wherein a cycle occurs every $\Delta t$.

In an embodiment, the current rate is calculated as:

Current_Rate=Previous_Rate+($W_a \cdot C - W_b \cdot$ Previous_Rate), where C represents the number of bits dispatched in the current cycle and where $W_a$ and $W_b$ are weights. When using the above-provided expression, the Previous_Rate for the next calculation cycle can be set to the Current_Rate that was calculated in the last calculation cycle. In an embodiment, $W_a$ is a function of $N_c$ and $\Delta t$, where $\Delta t$ is a sampling interval and $N_c$ is a constant number of the sampling intervals. More specifically, $W_a$ can be defined as $W_a = 1/(N_c \cdot \Delta t)$. In an embodiment, $W_b$ is a function of $N_c$. More specifically, $W_b$ can be defined as $W_b = 1/N_c$.

When using the above-provided rate expression, the magnitude of traffic bursts can be controlled by establishing an Initial_Rate and adjusting the Current_Rate to the Initial_Rate if the Current_Rate falls below the Initial_Rate.

The sum of the error can be calculated as:

Current_Error=Previous_Error+(Current_Rate-Desired_Rate), where the Current_Rate is calculated according to the above-provided expression. The magnitude of packet bursts can be controlled by establishing a minimum threshold for the Current_Error and adjusting the Current_Error to the threshold if the Current_Error falls below the threshold. When using the above-provided error expression, the Previous_Error for the next calculation cycle is set to the Current_Error that was calculated in the last calculation cycle. In an embodiment, packets are allowed to flow if the Current_Error is less than or equal to zero and are not allowed to flow if the Current_Error is greater than zero. The invention can be embodied in a method and system for controlling the flow of packet-based traffic. The method and system can be used for rate shaping or rate limiting and the performance characteristics of the algorithm can be easily adjusted by adjusting the user provided input parameters of Initial_Rate, Desired_Rate, $N_c$, and $\Delta t$.

The invention is also embodied in a method that is specific to rate shaping, wherein packets are dispatched from a buffer in response to the calculated sum of the error between the calculated current rate and the desired rate.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3A depicts a graph of a traffic profile that is generated from implementing a rate shaping algorithm in accordance with an embodiment of the invention.

FIG. 3B depicts a graph of the sum of the error between the calculated current rate and the desired rate from FIG. 3A.

FIG. 3C depicts a graph of a switch control signal that is generated in response to the sum of the error between the calculated current rate and the desired rate from FIG. 3B.

FIG. 8 depicts an example matrix of the logic that is implemented by one of the selectors from FIG. 7 to enable available bandwidth to be shared in accordance with an embodiment of the invention.

DETAILED DESCRIPTION

A method and system for controlling the flow of packet-based traffic to meet a desired rate involves calculating, as a moving average, a current rate of packet-based traffic on a link, calculating the sum of the error between the calculated current rate and the desired rate, and determining whether or not packets can flow in response to the calculated sum of the error. In an embodiment, when the sum of the error between the current rate and the desired rate is less than or equal to zero, packets are dispatched from a buffer onto a link and when the sum of the error is greater than zero, packets are held in the buffer. Because the flow of packets is controlled in response to the sum of the error between the current rate and the desired rate, the achieved rate of traffic is maintained close to the desired rate even in bursty traffic environments.

Figure 1:
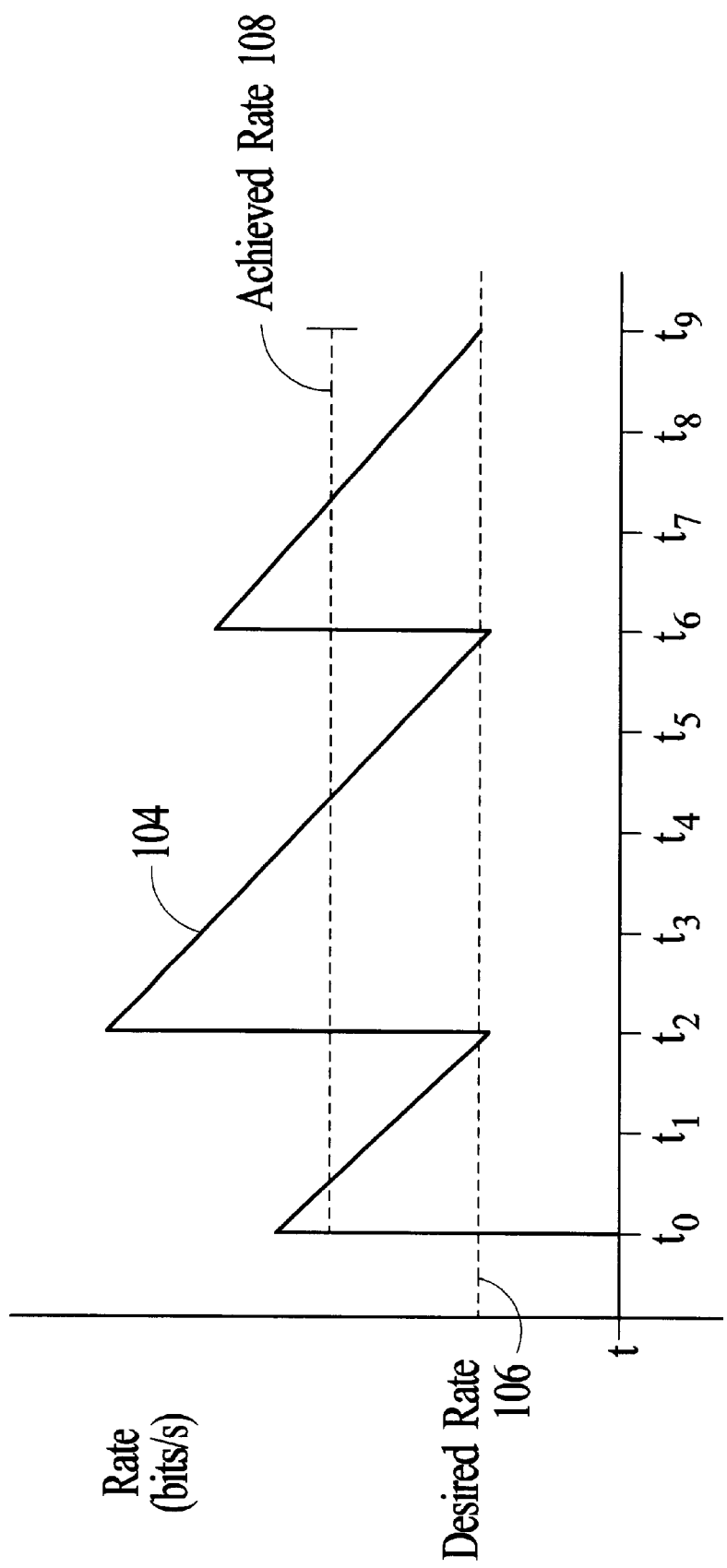
FIG. 1 depicts an example graph of traffic rate versus time, in increments of $\Delta t$, that results from application of an EWMA algorithm in a rate shaping system where the buffer is fully loaded with packets in accordance with the prior art.
Figure 2:
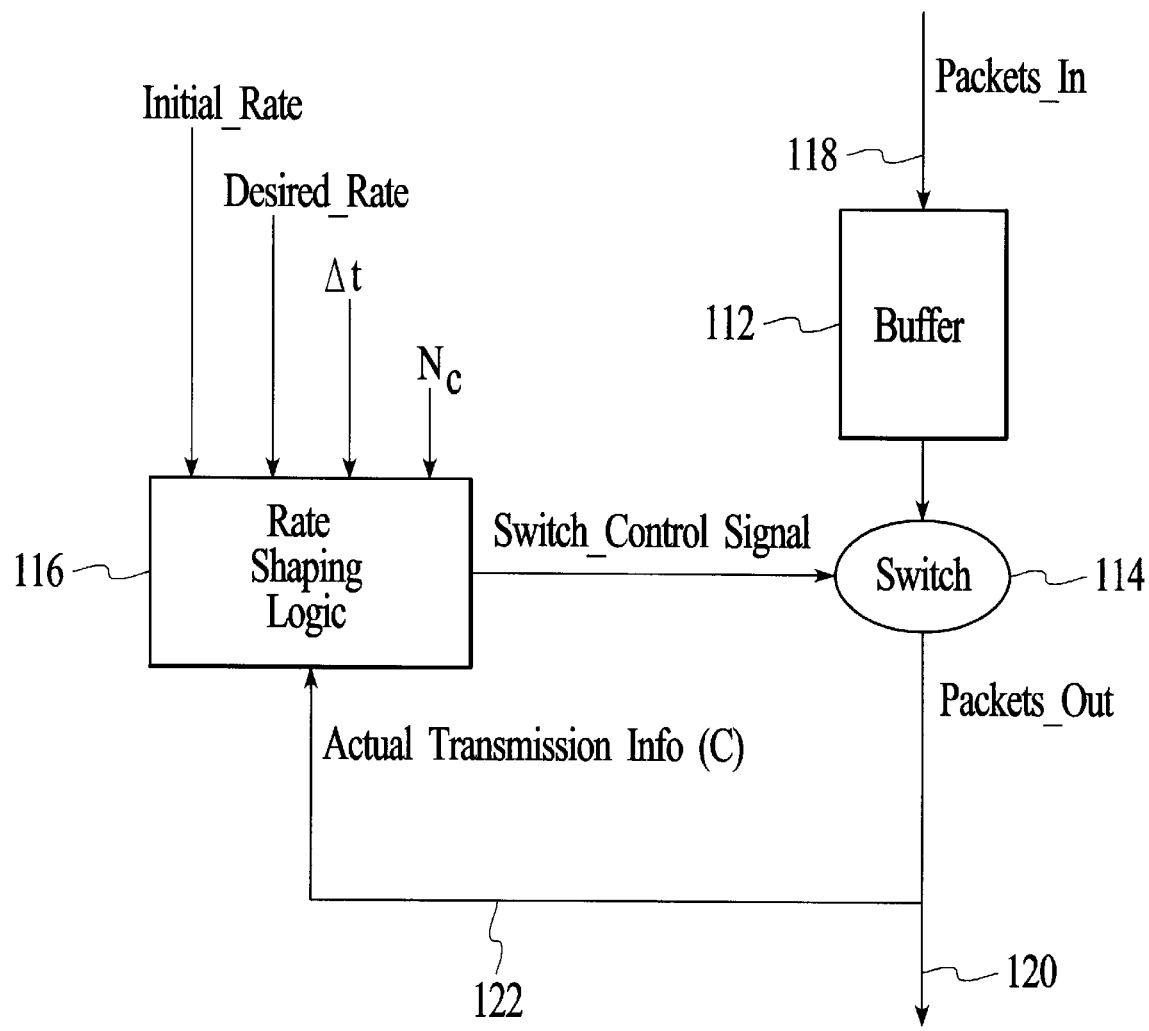
FIG. 2 depicts a rate shaping system that implements a rate shaping algorithm according to an embodiment of the invention.

FIG. 2 depicts an example of a rate shaping system that can be used to implement the rate shaping algorithm that is the focus of the invention. The rate shaping system includes a buffer 112, a switch 114, and rate shaping logic 116. The buffer receives incoming packets on an input link 118 and buffers the packets until they are dispatched to an output link 120. The switch is the gateway between the buffer and the output link. The switch is controlled by the rate shaping logic and the rate shaping logic implements the rate shaping algorithm as described below. An embodiment of the rate shaping algorithm requires providing initial information in four fields (Initial_Rate, Desired_Rate, $\Delta t$, and $N_c$) as user defined input parameters to the rate shaping logic. The fields Initial_Rate, Desired_Rate, $\Delta t$, and $N_c$ are defined below. In operation, the rate shaping logic receives actual transmission information, C, related to the output link and outputs a control signal (Switch_Control) to the switch. The control signal generated by the rate shaping logic causes the switch to turn on (if it is not already on) so that packets are dispatched from the buffer or to turn off (if it is not already turned off) so that packets are held in the buffer. Although a switch is depicted in FIG. 2 as the mechanism for dispatching packets from the buffer, other mechanisms can be used to dispatch packets from the buffer. As defined herein, the input and output links may include a bus on an integrated circuit, a bus on a circuit board, a medium such as a wire, an optical fiber, an RF signal that connects two network devices, or any other link that is used to communicate packetized information. The input and output links may also include any combination of the above-identified links.

One of the primary steps in carrying out the algorithm of the invention involves calculating, as a moving average, the current rate of packet-based traffic. A technique for calculating the current rate of packet-based traffic as a moving average is described below followed by a description of a technique for calculating the sum of the error between the calculated current rate and the desired rate. An embodiment of a rate shaping algorithm is then described in more detail with reference to FIGS. 3 through 9.

The rate (i.e., in bits/second) of packet-based traffic over a given period of time, T, can be expressed as:

$$R = \frac{\sum C}{T}$$

where $\Sigma C$ is the total number of bits transmitted in time T. In a sampled domain of N sampling intervals, the rate can be expressed as:

$$Rate_N = \frac{\sum_{i=0}^{N} C_i}{N \cdot \Delta t}$$

where $\Delta t$ is a sampling interval and N is the number of sampling intervals over which the rate is calculated. This implies the following about the sampling interval that occurs previous to the $N^{th}$ interval:

$$Rate_{N-1} = \frac{\sum_{i=0}^{N-1} C_i}{(N-1) \cdot \Delta t}$$

It follows that the sum of the bits transmitted during sampling intervals 0 to N can be expressed as:

$$\sum_{i=0}^{N} C_i = \sum_{i=0}^{N-1} C_i + C_N$$

Substituting using $Rate_N$ and $Rate_{N-1}$ from above:

$$Rate_N \cdot N \cdot \Delta t = Rate_{N-1} \cdot (N-1) \cdot \Delta t + C_N$$

Thus we can express $Rate_N$ recursively as:

$$Rate_N = Rate_{N-1} + \frac{C_N}{N \cdot \Delta T} - \frac{Rate_{N-1}}{N}$$

or $$Rate_N = Rate_{N-1} + W_a \cdot C_N - W_b \cdot Rate_{N-1}$$

Where the weights $W_a$ and $W_b$ are defined as:

$$W_a = \frac{1}{N \cdot \Delta t}, \text{ and } W_b = \frac{1}{N}$$

Although N is a variable in the above derivation, N can be set to a constant value to simplify the rate calculation. In an embodiment, N is set to a constant value, $N_c$, for calculation of the weights $W_a$ and $W_b$, such that:

$$W_a = \frac{1}{N_c \cdot \Delta t}, \text{ and } W_b = \frac{1}{N_c}$$

where $N_c$ represents a constant number of sampling intervals. The rate calculation can be restated as:

$$Current\_Rate = Previous\_Rate + [W_a \cdot C - W_b \cdot Previous\_Rate]$$

where Current_Rate relates to $Rate_N$, Previous_Rate relates to $Rate_{N-1}$, where $W_a$ and $W_b$ are calculated using $N_c$, and where C is actual transmission information related to the number of bits transmitted during the most recent sampling interval.

In the embodiment of FIG. 2, C represents the actual number of bits that are dispatched to the output link 120 of the system in the last sampling interval. In FIG. 2, logical line 122 represents actual transmission information related to the output link that is supplied to the rate shaping logic. Although logical line 122 is connected to the output link in FIG. 2, the actual transmission information can be supplied to the rate shaping logic by various techniques and the exact technique used is not critical to the invention. For example, the actual transmission information may be supplied from the buffer.

The other primary step in carrying out the algorithm involves calculating the sum of the error between the calculated current rate and the desired rate. Throughout this description, the error between the calculated current rate and the desired rate is referred to as the "Residue" although it should be understood that the terms "error" and "Residue" are interchangeable. In a sampled domain of N sampling intervals, the instantaneous Residue at the $N^{th}$ sampling interval is expressed as $Residue_N = Rate_N - Desired\_Rate$. The sum of the Residue in the $N^{th}$ sampling interval is expressed herein as:

$$\sum_{i=0}^{N} Residue_N = \sum_{i=0}^{N} (Rate_N - Desired\_Rate)$$

This implies the following about the sampling interval that occurs previous to the $N^{th}$ sampling interval:

$$\sum_{i=0}^{N-1} Residue_{N-1} = \sum_{i=0}^{N-1} (Rate_{N-1} - Desired\_Rate)$$

Thus, the sum of the Residue at the $N^{th}$ sampling interval can also be expressed in terms of the previous sum of the Residue at the N–1 sampling interval plus the instantaneous Residue at the $N^{th}$ sampling interval as:

$$\sum_{i=0}^{N} Residue_N = \sum_{i=0}^{N-1} Residue_{N-1} + Residue_N$$

Substituting $Residue_N = Rate_N - Desired\_Rate$ gives:

$$\sum_{i=0}^{N} Residue_N = \sum_{i=0}^{N-1} Residue_{N-1} + (Rate_N - Desired\_Rate)$$

Thus, the sum of the Residue at the $N^{th}$ sampling interval can be expressed in terms of a current Residue and a previous Residue as:

Current_Residue=Previous_Residue+(Current_Rate−Desired_Rate)

where the Current_Rate is calculated as described above, where the Previous_Residue relates to the sum of the Residue at the last sampling interval, and where the Desired_Rate is provided as a user input.

Utilizing the algorithm for rate shaping involves calculating the Current_Rate and the Current_Residue every sampling interval, i.e., every Δt, and then generating a switch control signal based on the value of the Current_Residue. In an embodiment, if the Current_Residue is less than or equal to zero, then a control signal that causes the switch to dispatch packets (i.e., a "1") is generated and if the Current_Residue is greater than zero, then a control signal that causes the switch to hold packets (i.e., a "0") is generated. Packets are dispatched when the Current_Residue is less than or equal to zero because the sum of the Residue indicates that the achieved rate is currently at or below the desired rate and conversely packets are held when the Current_Residue is greater than zero because the sum of the Residue indicates that the achieved rate is currently below the desired rate. Using this algorithm, over an extended period of time, the achieved rate of packet traffic will approach the desired rate. Although in this embodiment, a Residue value of zero is the critical value between dispatching and holding packets, in other embodiments the value may be mathematically manipulated to some value other than zero.

In an embodiment, the rate shaping algorithm is carried out in cycles, where each cycle spans the time period of Δt, which is the same as the sampling interval. Upon beginning a new cycle, the values of the Previous_Rate and Previous_Residue are updated to reflect the current values. Specifically, the Current_Rate that was calculated in the previous cycle is used for the Previous_Rate and the Current_Residue that was calculated in the previous cycle is used for the Previous_Residue. The overall rate shaping algorithm can be expressed in pseudo code, for example purposes, as:

//Rate Shaping Algorithm: Executes every Δt.
//PartI: Update Rate and Residue:
Current_Rate=Previous_Rate+$W_a$·C−$W_b$·Previous_Rate;
Current_Residue=Previous_Residue+(Current_Rate−Desired_Rate);
I/PartII: Update the Switch:
If(Current_Residue<=0) Switch_Control=1;
else Switch_Control=0;
Previous_Rate=Current_Rate;
Previous_Residue=Current_Residue;

FIGS. 3A, 3B, and 3C are a series of time synchronized graphs that represent example results from implementing the above-described algorithm for rate shaping. FIG. 3A is a graph of a rate profile that is generated by implementing the above-described algorithm. The graph depicts an example of the Current_Rate 304 of packet traffic, calculated as a moving average, versus time (in increments of Δt) in relation to the desired rate 306 of packet traffic. FIG. 3B is a graph of the sum of the Residue 328 that results from the rate profile in FIG. 3A and FIG. 3C is a graph of the switch control signal 330 that is generated from the rate shaping algorithm in response to the sum of the Residue. In this example, a switch control signal of "1" causes packets to be dispatched and a switch control signal of "0" causes packets to be held.

In describing the example results of FIGS. 3A–3C, it is assumed that the algorithm is initiated at time $t_0$ and that at the same time a burst of packets is dispatched from the buffer. The dispatched packets at time $t_0$ cause the Current_Rate to shoot up as indicated in FIG. 3A. At time $t_1$, the increase in the Current_Rate causes the Current_Residue to go from zero to some value greater than zero, which in turn causes the switch control signal to go from "1" to "0," which in turn causes any remaining buffered packets to be held. While the switch is not dispatching new packets, the Current_Rate of packet traffic falls as depicted in FIG. 3A by the downward slope of the Current_Rate between time $t_0$ and time $t_8$. In response to the Current_Rate, and as depicted in FIG. 3B, the Current_Residue rises as long as the Current_Rate is above the Desired_Rate and falls once the Current_Rate goes below the Desired_Rate. The response of the Current_Residue results from the relationship between the Current_Residue, the Current_Rate, and the Desired_Rate as described above. At the point where the Current_Residue becomes less than or equal to zero, the switch control signal changes from "0" to "1" allowing another burst of packets to be dispatched from the buffer. For example, at time $t_8$, the Current_Residue equals zero, which causes the switch control signal to go from "0" to "1," as depicted in FIG. 3C. When the switch control signal goes to "1," another burst of packets is released and the Current_Rate shoots up, as indicated by the Current_Rate at time $t_8$. Referring to FIGS. 3B and 3C, the switch control signal switches from "0" to "1" each time the Current_Residue goes to zero and then switches back from "1" to "0" once the Current_Residue has risen above zero. This mechanism ensures that the overall average traffic rate in a fully loaded system stays at or near the desired rate.

Figure 4:
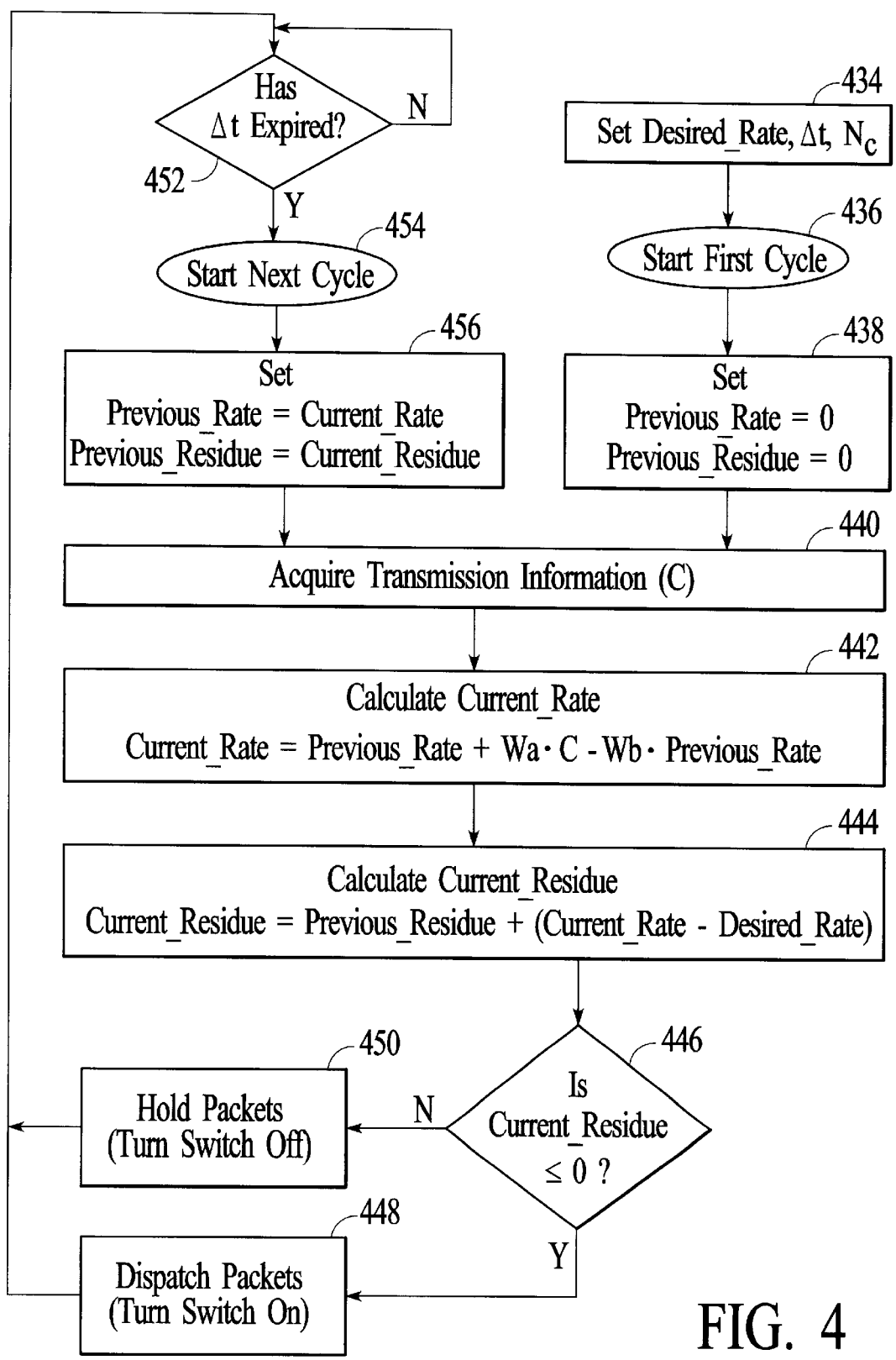
FIG. 4 depicts a process flow diagram for controlling the flow rate of packet-based traffic to meet a desired rate in accordance with an embodiment of the invention.

FIG. 4 depicts an embodiment of a process flow diagram for carrying out the above-described rate shaping algorithm. Before the first cycle is started, the values of Desired_Rate, $N_c$, and $\Delta t$ are set for the rate shaping algorithm, step 434. Setting the values of Desired_Rate, $N_c$, and $\Delta t$ may involve a manual user input or an automatic input that is generated in response to a broader QoS system. At the start of the first cycle, step 436, the Previous_Rate and Previous_Residue are set to zero, step 438. At step 440, transmission information, C, is acquired. At step 442, the Current_Rate is calculated, as described above, using the provided expression. Values used to calculate the Current_Rate include the Previous_Rate, C, $W_a$, and $W_b$. After calculating the Current_Rate, at step 444, the Current_Residue is calculated, as described above, using the provided expression. Values used to calculate the Current_Residue include the Previous_Residue, the Current_Rate, and the Desired_Rate. The calculated Current_Residue is then used at decision point 446 to determine whether packets should be dispatched or held. If the Current_Residue is less than or equal to zero then, at step 448, packets are dispatched and if the Current_Residue is greater than zero, then, at step 450, packets are held. In an embodiment, dispatching packets involves generating a control signal that turns on a switch and holding packets involves generating a control signal that turns off the switch. After the decision to dispatch or hold packets is made, at decision point 452, if the sampling interval $\Delta t$ has expired, the next cycle is started, step 454. To start the next cycle, the value of the Current_Rate that was calculated in the last cycle is used as the Previous_Rate for the subsequent rate calculation and the value of the Current_Residue that was calculated in the last cycle is used as the Previous_Residue for the subsequent Residue calculation, step 456. After the values of Previous_Rate and Previous_Residue are set, the process of acquiring transmission information, C (step 440), calculating the Current_Rate (step 442), calculating the Current_Residue (step 444), and determining whether to dispatch or hold packets (decision point 446) is repeated as described above. The process is continuously repeated every $\Delta t$ time interval.

Figures 5A, 5B:
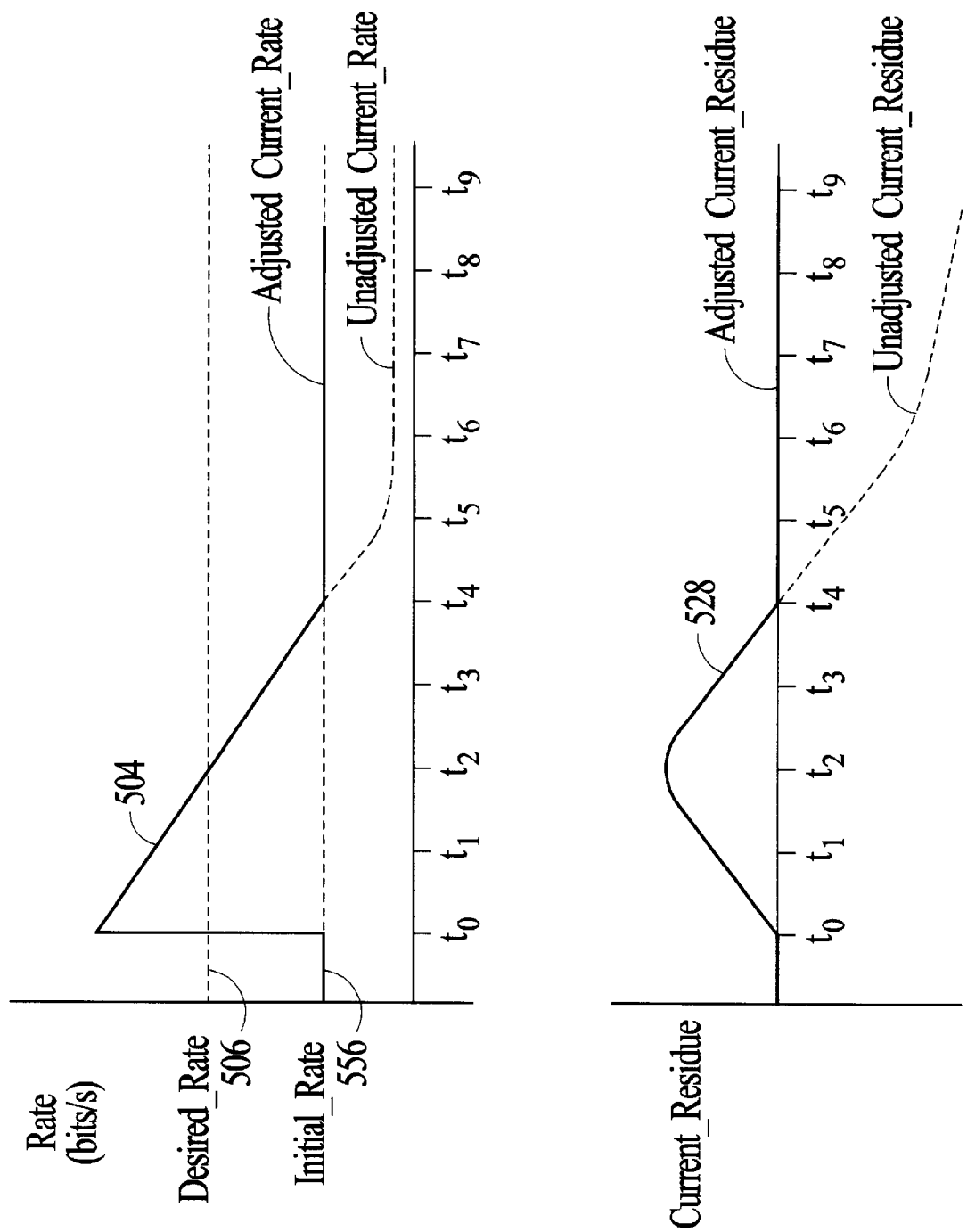
FIG. 5A depicts a graph of an unadjusted rate profile that is generated using the rate shaping algorithm depicted in FIG. 4, including a portion of the rate profile that is adjusted according to another embodiment of the invention.
FIG. 5B is a graph of the unadjusted sum of the error between the calculated rate and the desired rate that results from the rate profile of FIG. 5A, including a portion of the sum of the error that is adjusted according to another embodiment of the invention.

Although the above-described algorithm works well when the input buffer of a rate shaping system is fully loaded, the rate shaping algorithm may allow incoming bursts to be dispatched without being rate shaped when the bursts are preceded by periods of no traffic. Bursts may be dispatched without rate shaping when preceded by periods of no traffic because periods of no traffic will allow a relatively large negative Residue to accumulate. Under the above-described algorithm, the large negative Residue will allow bursts of packets to be dispatched for as long as the Current_Residue remains below zero. In order to prevent large bursts of traffic after periods of no traffic, the values of Current_Rate and Current_Residue are artificially controlled to pre-established thresholds in certain circumstances. Specifically, in an embodiment, the Current_Rate is controlled so that it is not allowed to fall below a pre-established rate, referred to herein as the Initial_Rate and the Current_Residue is controlled so that it does not fall below zero. Ensuring that the Current_Rate and the Current_Residue do not fall below certain threshold levels controls the amount of bandwidth that can be "borrowed" from previous periods of no traffic. FIGS. 5A and 5B depict the problem that is caused by periods of no traffic and the adjustments that are made to the Current_Rate and Current_Residue to ensure that all packets are rate shaped, even after periods of no traffic. FIG. 5A depicts a graph of a rate profile that is generated using the rate shaping algorithm and FIG. 5B is a time synchronized graph of the sum of the Residue that results from the rate profile of FIG. 5A.

Referring to FIG. 5A, it is assumed for example purposes that an initial burst of traffic at time $t_0$ is followed by a period of no traffic. As time passes, the calculated Current_Rate 504 falls towards zero unless it is artificially adjusted. In order to maintain the Current_Rate at a minimum value, the Current_Rate is adjusted to a predefined Initial_Rate 556 whenever the calculated Current_Rate is below the Initial_Rate. FIG. 5A depicts how the Current_Rate is adjusted to the predefined Initial_Rate whenever the calculated Current_Rate is below the Initial_Rate.

In an embodiment, the value of Initial_Rate is found using a simulation. The simulation is used to find the lowest value of the Current_Rate that occurs in a system that is fully loaded with packets. The lowest value that occurs is then established as the Initial_Rate. In an embodiment, when the simulation is started, the Current_Rate is initialized to the Desired_Rate.

Referring to FIG. 5B, whenever the Current_Rate 504 from FIG. 5A is less than the Desired_Rate 506, the Current_Residue 528 will decline. The Current_Residue will decline indefinitely while the Current_Rate is less than the Desired_Rate unless it is artificially adjusted. In order to maintain the Current_Residue at a minimum value, the Current_Residue is adjusted to zero whenever the calculated Current_Residue is below zero. FIG. 5B depicts a segment of the Current_Residue that has been adjusted to zero because the calculated Current_Residue is below zero. Although in this embodiment, the Current_Residue is adjusted to a minimum Current_Residue of zero, the Current_Residue could be adjusted to some other minimum threshold value.

Figure 6:
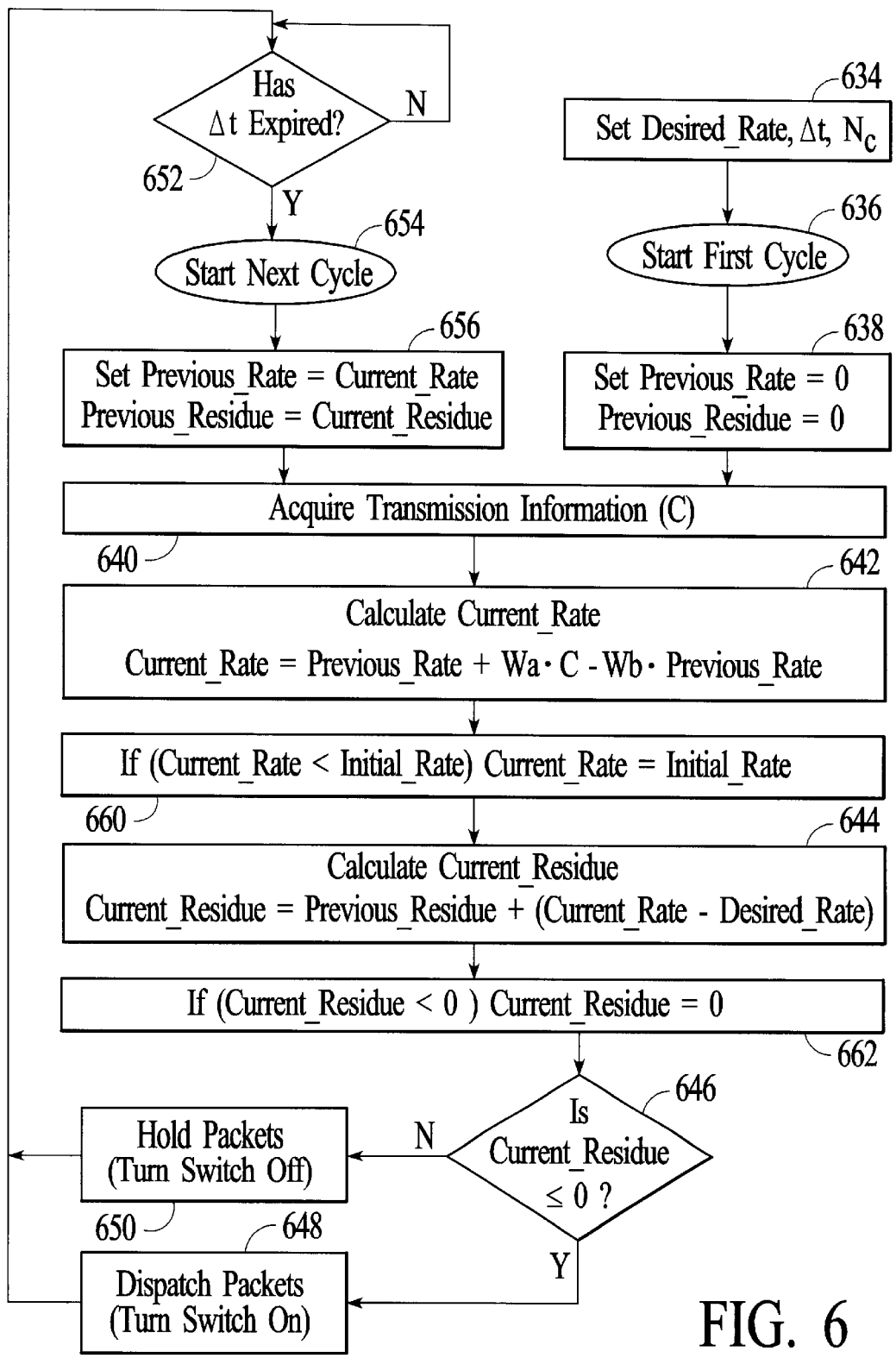
FIG. 6 depicts a process flow diagram for controlling the flow rate of packet-based traffic to meet a desired rate that has been modified to account for periods of no traffic in accordance with another embodiment of the invention.

An embodiment of pseudo code for the updated rate shaping algorithm is as follows:

//Modified Rate Shaping Algorithm: Executes every $\Delta t$.
//PartI: Update Rate and Residue:
Current_Rate=Previous_Rate+$W_a$·C−Wb·Previous_Rate;
If(Current_Rate<Initial_Rate) Current_Rate=Initial_Rate;
Current_Residue=Previous_Residue+(Current_Rate−Desired_Rate);
If(Current_Residue<0) Current_Residue=0;
//PartII: Update the Switch:
If(Current_Residue=0) Switch_Control=1;
else Switch_Control=0;
Previous_Rate=Current_Rate;
Previous_Residue=Current_Residue;

FIG. 6 depicts a process flow diagram for carrying out the rate shaping algorithm of FIG. 4 with the above-described modifications. The process flow diagram is similar to the process flow diagram of FIG. 4 except that; at step 634 an Initial_Rate is established in addition to the other parameters, at additional step 660 the Current_Rate is set to the Initial_Rate if the Current_Rate is less than the Initial_

Rate, at additional step 662 the Current_Residue is set to zero if the Current_Residue is less than zero, and at decision point 646 packets are dispatched if the Current_Residue is equal to zero and held if the Current_Residue is greater than zero.

Figure 7:
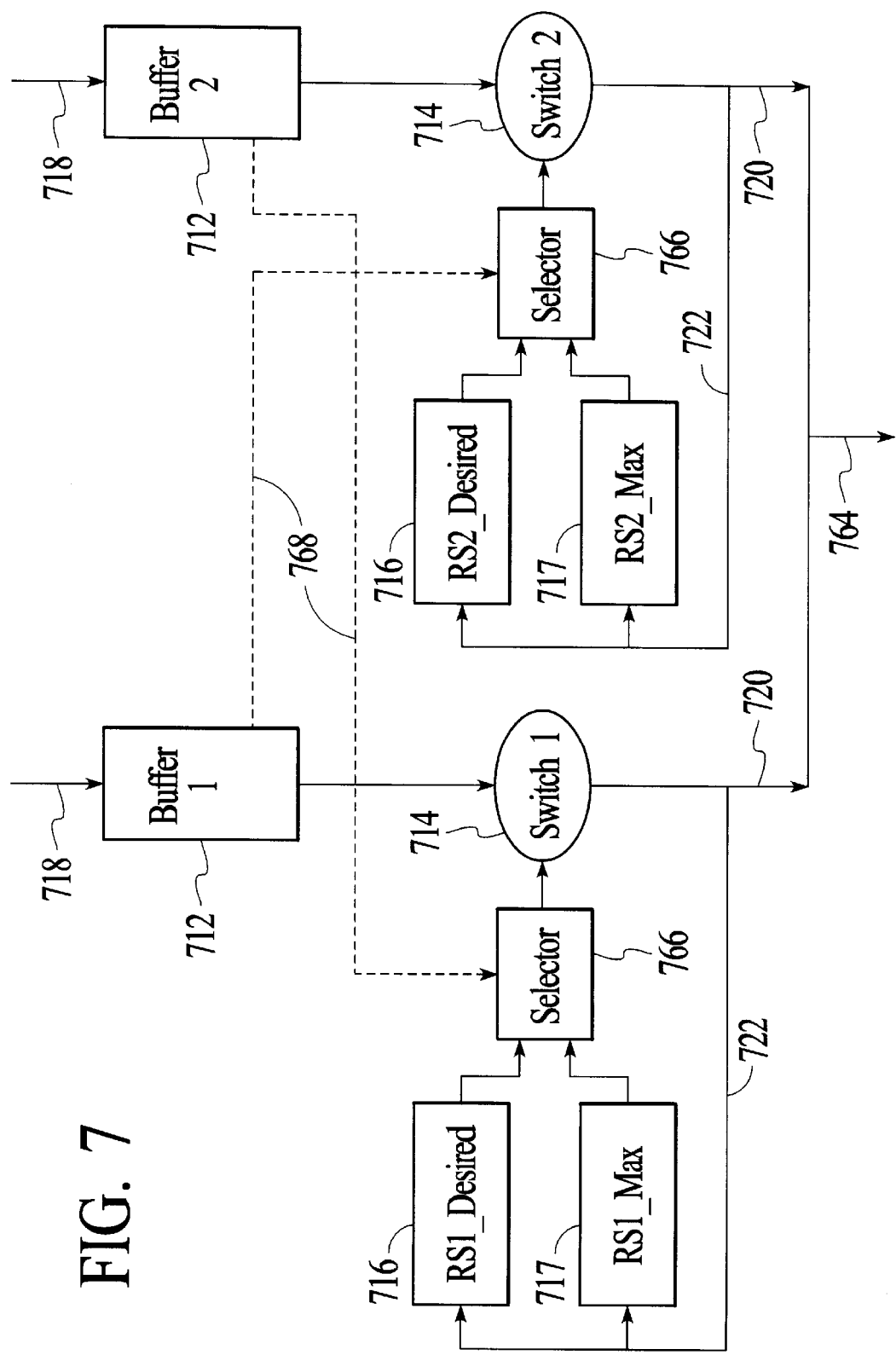
FIG. 7 depicts an example embodiment of two buffers that are connected to the same output link and controlled by buffer-specific switches, in which multiple instances of the rate shaping algorithm from FIG. 4 or 6 is implemented to allow unused bandwidth to be used by other buffers in accordance with an embodiment of the invention.

In an alternative embodiment, the above-described rate shaping algorithm can be implemented in a multi-buffer system to allow the available bandwidth to be used by other buffers that are connected to the same link. Specifically, the multi-buffer system allows bandwidth allocated to a second buffer to be borrowed by a first buffer when the second buffer does not hold any packets (i.e., when the second buffer is underutilizing its available bandwidth). FIG. 7 depicts an example embodiment of two buffers 712 (buffer 1 and buffer 2) that are connected to a common output link 764 and controlled by buffer-specific switches 714. Each buffer-specific switch is connected to two buffer-specific rate shapers 716 and 717 through buffer-specific selectors 766. The buffer-specific rate shapers implement two versions of the above-described rate shaping algorithm. As indicated by the dashed lines 768, each selector receives buffer state information from the other buffer and as indicated by lines 722, each rate shaper receives actual transmission information related to its respective buffer.

In the embodiment of FIG. 7, it is assumed that the rate of dispatch from buffer 1 needs to be controlled to a desired rate and that the rate of dispatch can be controlled to a maximum rate if there is unused bandwidth available on the common output link 764. The same holds true for buffer 2. To achieve the desired rate shaping at each of the buffers, two rate shapers are associated with each buffer. With reference to buffer 1, one rate shaper, RS1_Desired 716, is set to rate shape buffer 1 to a desired rate (i.e., the Desired_Rate field in the algorithm is set to the desired rate) and the other rate shaper, RS1_Maximum 717, is set to rate shape buffer 1 to a maximum rate (i.e., the Desired_Rate field in the algorithm is set to the maximum rate). Likewise, with reference to buffer 2, RS2_Desired 716, is set to rate shape buffer 2 to a desired rate (i.e., the Desired_Rate field in the algorithm is set to the desired rate) and the other rate shaper, RS2_Maximum 717, is set to rate shape buffer 2 to a maximum rate (i.e., the Desired_Rate field in the algorithm is set to the maximum rate). In the embodiment of FIG. 7, when there is traffic in each buffer, then each buffer is controlled to its desired rate by rate shapers RS1_Desired and RS2_Desired, respectively. However, if one of the buffers does not have buffered traffic, then the other buffer can be allowed to go up to its maximum rate.

Rate shaping of buffer 1 with dual rate shapers is described for example purposes with reference to FIGS. 7 and 8. FIG. 8 depicts an example matrix 770 of the logic that is implemented by the selector 766 for buffer 1. If the control signal output from RS1_Desired 716 is "1," indicating that packets can be dispatched from buffer 1, then the selector outputs a control signal of "1" to the switch and packets are dispatched. The selector outputs a control signal of "1" regardless of the value of RS1_Maximum 717 and whether or not there are packets in buffer 2. If the control signal output from RS1_Desired is "0" and the control signal output from RS1_Maximum is "0," then the selector outputs a control signal of "0" to the switch regardless of whether or not there are packets in buffer 2. If the control signal output from RS1_Desired is "0" and the control signal output from RS1_Maximum is "1," then the selector looks to the status of buffer 2 to determine whether or not packets can be dispatched. If there are packets in buffer 2, then the selector outputs a control signal of "0" and no packets are dispatched from buffer 1. No packets are dispatched from buffer 1 because bandwidth that is reserved for the packets that are in buffer 2 must not be consumed by other buffers. However, if there are no packets in buffer 2 and RS1_Maximum is "1," then the selector for switch 1 will output a control signal of "1" to switch 1 and packets will be dispatched from buffer 1. The dispatch of packets from buffer 1 will be controlled by RS1_Maximum as long as there are no packets in buffer 2 and as long as RS1_Desired stays at "0."

The system described with reference to FIG. 7 can be scaled to include the control of more than two buffers. In a scaled system, the selector for each buffer monitors the buffer status of all of the other buffers, or some combination of the other buffers and uses the buffer information to determine if packets can be dispatched at the designated maximum rate.

Figure 9:
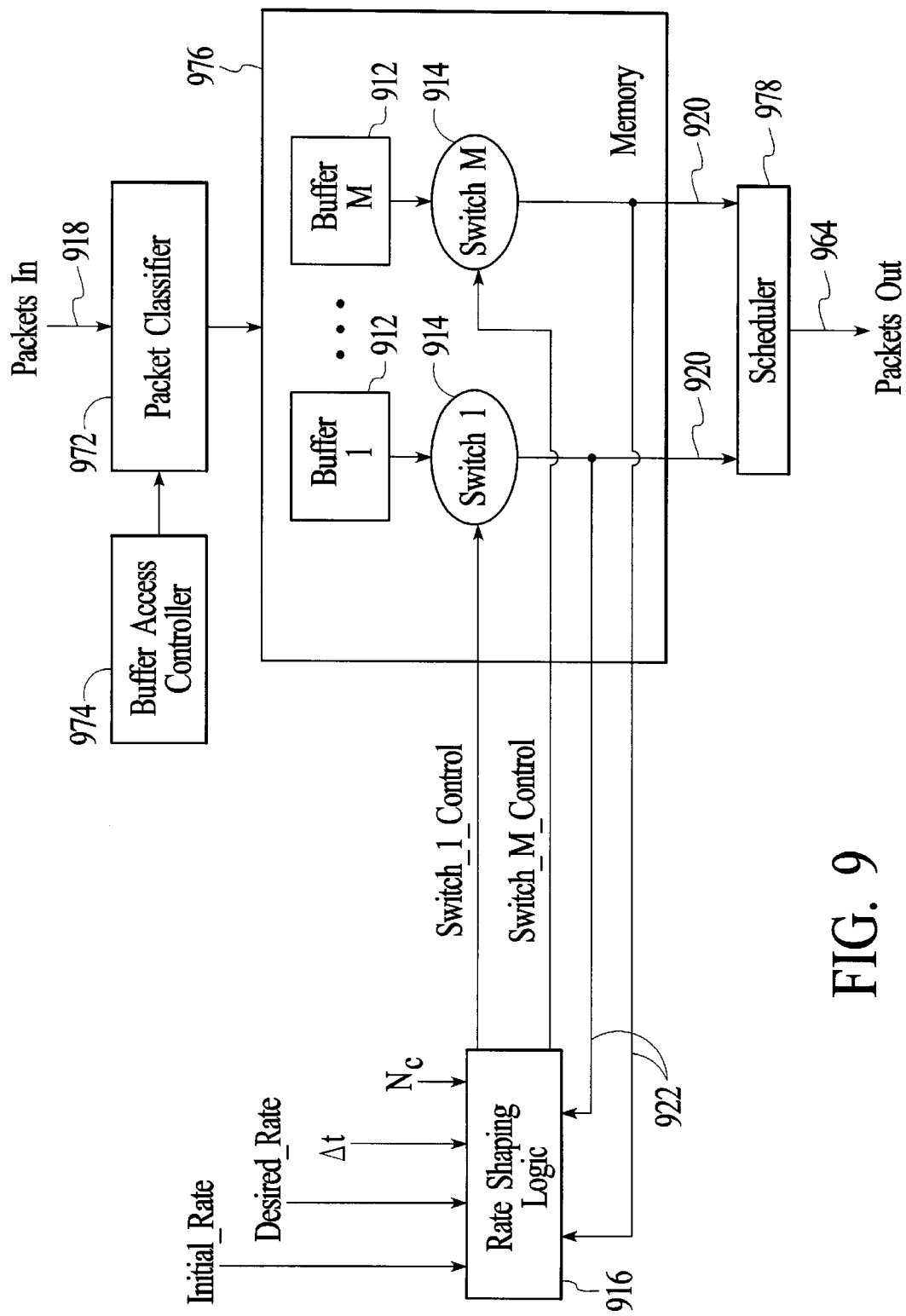
FIG. 9 depicts an embodiment of a QoS system in which the rate shaping algorithm from FIG. 4 or 6 is utilized to dispatch packets from multiple buffers in accordance with an embodiment of the invention.

The above-described rate shaping algorithm can also be used to simultaneously control multiple buffers. FIG. 9 depicts an embodiment of a QoS system in which the same rate shaping logic controls multiple buffers. The QoS system includes a packet classifier 972, a buffer access controller 974, memory 976, rate shaping logic 916, and a scheduler 978. The memory includes multiple buffers (i.e., buffers 1 to M) that are controlled by buffer-specific switches 914. Each one of the buffer-specific switches is controlled by the rate shaping logic as described above. The rate shaping logic receives actual transmission information related to the respective output links 920 and uses the actual transmission information to carry out the rate shaping algorithm and generate the switch control signals.

In operation, the classifier 972 determines which buffer each incoming packet should be buffered in. After packets are classified, the buffer access controller 974 determines whether or not the packets can be forwarded to their appropriate buffer. In an embodiment, the buffer access controller utilizes a weighted random early drop (WRED) algorithm to determine if classified packets should be forwarded to the respective buffer. The rate shaping logic 916 determines whether or not buffered packets are received by the scheduler 978. In an embodiment, the rate shaping logic performs the steps described with reference to FIG. 6 for each buffer during each cycle and outputs switch control signals (Switch_1_Control and Switch_M_Control) to the respective switches. Depending on the states of the switches, the scheduler dispatches packets. For example, the packet may be scheduled for switching across a switch fabric.

In an embodiment, the rate shaping algorithm described with reference to FIGS. 2-9 is implemented in hardware. As described above, the calculation of the Current_Rate requires two multiplication operations. In hardware implementations, multiplication operations require a relatively large amount of resources and it is desirable to limit the resource requirements of the hardware implementation. One way to reduce the resource requirements of multiplication operations is to reduce the multiplication operations to shifting. A hardware embodiment of the rate shaping algorithm in which the two multiplication operations have been reduced to shifting is described below.

The weight constant $W_a$ is defined above as $1/(N_c \cdot \Delta t)$, with $N_c$ being a number of time intervals. $N_c$ can be selected to be a power of two and in an embodiment, $N_c$ is a power of two between (and including) $2^9$ to $2^{13}$. As stated above, the algorithm executes every $\Delta t$ time interval. In order to reduce the multiplication operation to shifting, the time interval $\Delta t$ is also chosen so that it is a power of two, more specifically, a negative power of two. In an embodiment, the time interval Δt is a function the hardware clock time (or period) and the number of buffers that are controlled by the rate shaping algorithm. In a preferred embodiment, Δt should be greater than the clock time multiplied by the number of buffers that are controlled by the rate shaping logic (i.e., Δt>clock_time·number_of_buffers) so that the Current_Rate, Current_Residue, and switch can be updated for each buffer during each Δt. Note that this assumes that it takes one clock period to update the Current_Rate, the Current_Residue, and the switch for a single buffer. Table 1 provides example Δt values that can be used as a function of the number of buffers that are controlled by the rate shaping logic and as a function of the clock period. The table also includes the minimum Δt that can be utilized and the chosen Δt as a negative power of two.

TABLE 1

| Number of Buffers | Clock Period | min Δt | chosen Δt | Δt as 2^(−x) |
|---|---|---|---|---|
| 32 | 10 ns | 320 ns | 470 ns | 2^(−21) |
| 256 | 10 ns | 2,560 ns | 3,810 ns | 2^(−18) |
| 32 | 16 ns | 512 ns | 953 ns | 2^(−20) |

The weight constant $W_a$ is defined as $1/(N_c \cdot \Delta t)$. A constant $W_{ra}$ can be defined as: $W_{ra}=\log_2(W_a)$ and if $1/(N_c \cdot \Delta t)$ is a power of two and greater than one, $W_a \cdot C$ reduces to the following:

$$W_a \cdot C \approx (C << W_{ra})$$

Thus, the multiplication operation is reduced to a left shift operation.

The weight constant $W_b$ is defined as $1/N$. A constant $W_{rb}$ can be defined as: $W_{rb}=\log_2(W_b)$ and if $1/N$ is a power of two and less than one, Previous_Rate·$W_b$ reduces to the following:

$$\text{Previous\_Rate} \cdot W_b \approx (\text{Previous\_Rate} >> W_{rb})$$

Thus, the multiplication operation is reduced to a right shift operation.

Because shifting results in losing bits, the accuracy of the calculation may be reduced. To avoid a reduction in accuracy, fixed point arithmetic is implemented and the number of bits after the decimal is referred to as ACCURACY. The hardware implementation of the rate shaping algorithm can be expressed in pseudo code, for example purposes, as:

//Hardware Implementation of Rate Shaping Algorithm: Executes every Δt.
//PartI: Update Rate and Residue:
Current_Rate=Previous_Rate+((C<<ACCURACY)<<Wra)−(Previous_Rate>>Wrb);
If(Current_Rate<Initial_Rate) Current_Rate=Initial_Rate;
Current_Residue=Previous_Residue+(Current_Rate−Desired_Rate);
If(Current_Residue<0) Current_Residue=0;
//PartII: Update the Switch:
If(Current_Residue=0) Switch_Control=1;
else Switch_Control=0;
Previous_Rate=Current_Rate;
Previous_Residue=Current_Residue;

In an embodiment, the rate shaping algorithm is implemented in an environment that utilizes variable-length packets, for example an Ethernet environment, however, the rate shaping algorithm can also be implemented in an environment that utilizes fixed-length cells (or packets), for example, an asynchronous transfer mode (ATM) environment.

Although the algorithm implemented herein is used to accomplish rate shaping, the algorithm can be used to accomplish rate limiting or any other rate control technique. When the algorithm is used for rate limiting, packets are dropped when the Current_Residue is below a threshold (i.e., zero) and transmitted when the Current_Residue is above the threshold.

In the embodiments of the algorithm described above, the sum of the error between the current rate and the desired rate is calculated in a specific manner using the provided equations. However, it should be understood that the sum of the error between the current rate and the desired rate may be calculated in different ways without deviating from the scope and spirit of the invention that is described herein and claimed below.

Whether the rate shaping algorithm is implemented in hardware or software, the performance of the algorithm can be easily adjusted by simply adjusting any of the user input fields, Initial_Rate, Desired_Rate, Δt, and $N_c$. With respect to the Initial_Rate, a lower Initial_Rate effectively allows more bandwidth to be "borrowed" from previous periods of no traffic, which in turn allows larger bursts of packets to flow after periods of silence. With respect to Δt, a larger Δt will tend to make the traffic profile more bursty because the period of time between switch updates is longer. With respect to $N_c$, the smaller the value of $N_c$, the more closely the calculated Current_Rate will track the instantaneous rate, which in turn causes a faster response time. Likewise, the larger the value of $N_c$, the less closely the calculated Current_Rate will track the instantaneous rate, which in turn causes a slower response time.

The rate shaping algorithm can be implemented on a macro level, where the switch represents a node in a network or on an lower level where the switch controls the dispatch function from a particular buffer. Further, the switch can be any mechanism that controls the flow of packets onto a link.

Although specific embodiments of the invention have been described and illustrated, the invention is not limited to the specific forms and arrangements of parts so described and illustrated. The invention is limited only by the claims.

What is claimed is:

1. A method for controlling the flow of packet-based traffic to meet a desired rate comprising:
    calculating, as a moving average, a current rate of packet-based traffic on a link;
    calculating the sum of the error between said calculated current rate and said desired rate; and
    determining whether or not packets can flow in response to said calculated sum of said error.

2. The method of claim 1 wherein determining whether or not packets can flow includes allowing packets to flow if the sum of said error is below an error threshold and not allowing packets to flow if the sum of said error is above said error threshold.

3. The method of claim 1 wherein determining whether or not packets can flow includes allowing packets to flow if the sum of said error is less than or equal to zero and not allowing packets to flow if the sum of said error is greater than zero.

4. The method of claim 1 wherein determining whether or not packets can flow includes allowing packets to flow when the sum of said error indicates that the achieved rate of traffic is below the desired rate and not allowing packets to flow when the sum of the error indicates that the achieved rate of traffic is above the desired rate.

5. The method of claim 1 further including establishing a minimum value for said current rate and adjusting the value of said current rate if said current rate is below said minimum value.

6. The method of claim 1 further including establishing a minimum value for the sum of said error and adjusting the value of the sum of said error if the sum of said error is below said minimum value.

7. The method of claim 1 further including:
establishing minimum values for said current rate and the sum of said error;
adjusting the value of said current rate if said current rate is below said minimum value for said current rate; and
adjusting the value of the sum of said error if the sum of said error is below said minimum value for the sum of said error.

8. The method of claim 1 wherein said current rate is calculated using actual traffic information related to said link.

9. The method of claim 1 wherein calculating said current rate and the sum of said error and determining whether or not packets can flow are repeated every cycle, wherein a cycle occurs every $\Delta t$.

10. The method of claim 1 wherein said current rate is calculated as a weighted moving average.

11. The method of claim 10 wherein said current rate is calculated as:

Current_Rate=Previous_Rate+($W_a \cdot C - W_b \cdot$Previous_Rate);

where C represents a number of bits and $W_a$ and $W_b$ are weights.

12. The method of claim 11 wherein said Previous_Rate for the next calculation cycle is set to the Current_Rate that was calculated in the last calculation cycle.

13. The method of claim 11 wherein $W_a$ is a function of $N_c$ and $\Delta t$, where $\Delta t$ is a sampling interval and $N_c$ is a number of said sampling intervals.

14. The method of claim 11 wherein $W_a$ is defined as $W_a = 1/(N_c \cdot \Delta t)$, where $\Delta t$ is a sampling interval and $N_c$ is a number of said sampling intervals.

15. The method of claim 11 wherein $W_b$ is a function of $N_c$, where $N_c$ is a number of sampling intervals.

16. The method of claim 11 wherein $W_b$ is defined as $W_b = 1/N_c$, where $N_c$ is a number of sampling intervals.

17. The method of claim 11 further including establishing an Initial_Rate and adjusting said Current_Rate to said Initial_Rate if said Current_Rate falls below said Initial_Rate.

18. The method of claim 11 wherein the sum of said error is calculated as:

Current_Error=Previous_Error+(Current_Rate−Desired_Rate).

19. The method of claim 18 further including establishing a minimum threshold for said Current_Error and adjusting said Current_Error to said threshold if said Current_Error falls below said threshold.

20. The method of claim 18 wherein said Previous_Error for the next calculation cycle is set to the Current_Error that was calculated in the last calculation cycle.

21. The method claim 18 wherein packets are allowed to flow if said Current_Error is less than or equal to zero and are not allowed to flow if said Current_Error is greater than zero.

22. The method of claim 1 further including turning a switch on or off in response to said determination of whether or not packets can flow.

23. A system for controlling the flow of packet-based traffic between an input link and an output link to meet a desired rate comprising:
a switch connected between said input link and said output link that allows traffic to flow from said input link to said output link when said switch is on and that does not allow packets to flow when said switch is off; and
rate shaping logic connected to control said switch, said rate shaping logic including means for;
calculating, as a moving average, a current rate of packet-based traffic on one of said input and output links;
calculating the sum of the error between said calculated current rate and said desired rate; and
determining whether or not packets can flow through said output link in response to said calculated sum of said error.

24. The system of claim 23 wherein determining whether or not packets can flow includes allowing packets to flow if the sum of said error is below an error threshold and not allowing packets to flow if the sum of said error is above said error threshold.

25. The system of claim 23 wherein determining whether or not packets can flow includes allowing packets to flow if the sum of said error is less than or equal to zero and not allowing packets to flow if the sum of said error is greater than zero.

26. The system of claim 23 wherein determining whether or not packets can flow includes allowing packets to flow when the sum of said error indicates that the achieved rate of traffic is below the desired rate and not allowing packets to flow when the sum of the error indicates that the achieved rate of traffic is above the desired rate.

27. The system of claim 23 wherein said rate shaping logic includes logic for establishing a minimum value for said current rate and for adjusting the value of said current rate if said current rate is below said minimum value.

28. The system of claim 23 wherein said rate shaping logic includes logic for establishing a minimum value for the sum of said error and for adjusting the value of the sum of said error if the sum of said error is below said minimum value.

29. The system of claim 23 wherein said rate shaping logic includes logic for:
establishing minimum values for said current rate and the sum of said error;
adjusting the value of said current rate if said current rate is below said minimum value; and
adjusting the value of the sum of said error if the sum of said error is below said minimum value.

30. The system of claim 23 wherein said current rate is calculated using actual traffic information related to one of said input and output links.

31. The system of claim 23 wherein calculating said current rate and the sum of said error and determining whether or not packets can flow from said link are repeated every cycle, wherein a cycle occurs every $\Delta t$.

32. The system of claim 23 wherein said current rate is calculated as a weighted moving average.

33. The system of claim 32 wherein said current rate is calculated as:

Current_Rate=Previous_Rate+($W_a \cdot C - W_b \cdot$Previous_Rate);

where C represents a number of bits and $W_a$ and $W_b$ are weights.

34. The system of claim 33 wherein said Previous_Rate for the next calculation cycle is set to the Current_Rate that was calculated in the last calculation cycle.

35. The system of claim 33 wherein $W_a$ is a function of $N_c$ and $\Delta t$, where $\Delta t$ is a sampling interval and $N_c$ is a number of said sampling intervals.

36. The system of claim 33 wherein $W_a$ is defined as $W_a = 1/(N_c \cdot \Delta t)$, where $\Delta t$ is a sampling interval and $N_c$ is a number of said sampling intervals.

37. The system of claim 33 wherein $W_b$ is a function of $N_c$, where $N_c$ is a number of sampling intervals.

38. The system of claim 33 wherein $W_b$ is defined as $W_b = 1/N_c$, where $N_c$ is a number of sampling intervals.

39. The system of claim 33 wherein said rate shaping logic further includes logic for establishing an Initial_Rate and adjusting said Current_Rate to said Initial_Rate if said Current_Rate falls below said Initial_Rate.

40. The system of claim 33 wherein the sum of said error is calculated as:

Current_Error=Previous_Error+(Current_Rate−Desired_Rate).

41. The system of claim 40 wherein said rate shaping logic further includes logic for establishing a minimum threshold for said Current_Error and adjusting said Current_Error to said threshold if said Current_Error falls below said threshold.

42. The system of claim 40 wherein said Previous_Error for the next calculation cycle is set to the Current_Error that was calculated in the last calculation cycle.

43. The system claim 40 wherein packets are allowed to flow if said Current_Error is less than or equal to zero and are not allowed to flow if said Current_Error is greater than zero.

44. The system of claim 23 further including turning a switch on or off in response to said determination of whether or not packets can flow from said link.

45. A method for controlling the flow of packet-based traffic from a buffer onto an output link to meet a desired rate comprising:
calculating, as a moving average, a current rate of packet-based traffic on said output link;
calculating the sum of the error between said calculated current rate and said desired rate; and
determining whether or not packets can be dispatched from said buffer onto said output link in response to said calculated sum of said error.

46. The method of claim 45 wherein determining whether or not packets can be dispatched from said buffer includes allowing packets to be dispatched from said buffer if the sum of said error is below an error threshold and not allowing packets to be dispatched from said buffer if the sum of said error is above said error threshold.

47. The method of claim 45 wherein determining whether or not packets can be dispatched from said buffer includes allowing packets to be dispatched from said buffer if the sum of said error is less than or equal to zero and not allowing packets to be dispatched from said buffer if the sum of said error is greater than zero.

48. The method of claim 45 wherein determining whether or not packets can be dispatched from said buffer includes allowing packets to be dispatched from said buffer when the sum of said error indicates that the achieved rate of traffic is below the desired rate and not allowing packets to be dispatched from said buffer when the sum of the error indicates that the achieved rate of traffic is above the desired rate.

49. The method of claim 45 further including controlling the magnitude of packet bursts by establishing a minimum value for said current rate and adjusting the value of said current rate if said current rate is below said established minimum value for said current rate.

50. The method of claim 45 further including controlling the magnitude of packet bursts by establishing a minimum value for the sum of said error and adjusting the value of the sum of said error if the sum of said error is below said established value for the sum of said error.

51. The method of claim 45 further including:
establishing minimum values for said current rate and the sum of said error;
controlling the magnitude of packet bursts by adjusting the value of said current rate if said current rate is below said established minimum value for said current rate; and
controlling the magnitude of packet bursts by adjusting the value of the sum of said error if the sum of said error is below said established minimum value for the sum of said error.

52. The method of claim 45 wherein said current rate is calculated as:

Current_Rate=Previous_Rate+($W_a \cdot C - W_b \cdot$Previous_Rate);

where C represents a number of bits and $W_a$ and $W_b$ are weights.

53. The method of claim 52 further including establishing an Initial_Rate and adjusting said Current_Rate to said Initial_Rate if said Current_Rate falls below said Initial_Rate.

54. The method of claim 52 wherein the sum of said error is calculated as:

Current_Error=Previous_Error+(Current_Rate−Desired_Rate).

55. The method of claim 54 further including establishing a minimum threshold for said Current_Error and adjusting said Current_Error to said threshold if said Current_Error falls below said threshold.

* * * * *